US008096324B2

(12) United States Patent
Nakaoka et al.

(10) Patent No.: US 8,096,324 B2
(45) Date of Patent: Jan. 17, 2012

(54) ACCUMULATOR

(75) Inventors: Shinya Nakaoka, Fujisawa (JP); Kuniaki Miyake, Fujisawa (JP); Tomonari Saito, Fujisawa (JP); Hiroyuki Nikamoto, Fujisawa (JP); Eiji Mizutani, Kariya (JP); Tomoo Ogura, Kariya (JP)

(73) Assignees: NOK Corporation (JP); Advics Co., Ltd. (JP)

(*) Notice: Subject to any disclaimer, the term of this patent is extended or adjusted under 35 U.S.C. 154(b) by 124 days.

(21) Appl. No.: 12/679,860

(22) PCT Filed: Aug. 7, 2008

(86) PCT No.: PCT/JP2008/064184

§ 371 (c)(1), (2), (4) Date: Mar. 24, 2010

(87) PCT Pub. No.: WO2009/047942

PCT Pub. Date: Apr. 16, 2009

(65) Prior Publication Data

US 2010/0193059 A1 Aug. 5, 2010

(30) Foreign Application Priority Data

Oct. 10, 2007 (JP) ................................ 2007-263946

(51) Int. Cl.
*F16L 55/04* (2006.01)

(52) U.S. Cl. ........................................... 138/31; 138/30

(58) Field of Classification Search .................... 138/30, 138/31

See application file for complete search history.

(56) References Cited

U.S. PATENT DOCUMENTS

| | | | | |
|---|---|---|---|---|
| 6,189,572 B1 * | 2/2001 | Ruffer et al. | 138/30 |
| 6,286,552 B1 * | 9/2001 | Shimbori et al. | 138/31 |
| 6,405,760 B1 * | 6/2002 | Tranter et al. | 138/31 |
| 6,478,051 B1 * | 11/2002 | Drumm et al. | 138/30 |
| 6,805,166 B2 | 10/2004 | Suzuki et al. | |
| 7,770,599 B2 * | 8/2010 | Ota et al. | 138/31 |
| 7,810,522 B1 * | 10/2010 | Nakaoka et al. | 138/31 |
| 2003/0178076 A1 | 9/2003 | Suzuki et al. | |
| 2004/0003854 A1 * | 1/2004 | Kamimura | 138/30 |
| 2006/0037658 A1 * | 2/2006 | Shimbori et al. | 138/30 |
| 2010/0108168 A1 * | 5/2010 | Ota et al. | 138/30 |

FOREIGN PATENT DOCUMENTS

| | | | |
|---|---|---|---|
| DE | 3901261 A1 | 7/1990 |
| DE | 10304999 A | 8/2004 |
| JP | 2001-336502 A | 12/2001 |
| JP | 2003-278702 A | 10/2003 |
| JP | 2002-70801 A | 2/2004 |

(Continued)

*Primary Examiner* — James Hook

(74) *Attorney, Agent, or Firm* — Harness, Dickey & Pierce, P.L.C.

(57) ABSTRACT

To restrain abnormal deformation of a bellows due to a pressure difference between the inside and outside thereof, an outside gas type accumulator includes a pressure difference regulation mechanism (21) having a movable plate (22) supported by a coil spring (23) on the oil port (4) side of a bellows cap (8), the plate (22) moves together with the cap (8) in a state of being supported by the spring (23), during normal operation, the plate (22) moves together with the cap (8) to be brought into contact with a seal (13) at zero-down time, and the plate (22) keeps contact with the seal (13) and the cap (8) moves to a position where liquid pressure and gas pressure balances while compressing the spring (23) when the liquid and the charged gas expand thermally.

2 Claims, 8 Drawing Sheets

FOREIGN PATENT DOCUMENTS

| | | | |
|---|---|---|---|
| JP | 2005-500487 | A | 1/2005 |
| JP | 2005-315429 | A | 11/2005 |
| JP | 2007-187229 | A | 7/2007 |
| JP | 2007-192290 | A | 8/2007 |
| WO | WO-03/016774 | A1 | 2/2003 |
| WO | WO-2007/083471 | A1 | 7/2007 |

* cited by examiner

ACCUMULATOR

CROSS-REFERENCE TO RELATED APPLICATIONS

This is a national stage of the International Application No. PCT/JP2008/064184 filed on Aug. 7, 2008 and published in the Japanese language. This application claims the benefit of Japanese Application No. 2007-263946, filed on Oct. 10, 2007. The disclosures of the above applications are incorporated herein by reference.

BACKGROUND OF THE INVENTION

1. Field of the Invention

The present invention relates to an accumulator which is used as a pressure accumulating apparatus, a pulse pressure damping apparatus or the like. The accumulator in accordance with the present invention is used, for example, in a hydraulic piping or the like in a vehicle such as a motor vehicle or the like.

2. Description of the Conventional Art

Conventionally, there has been known an accumulator structured such that a bellows is arranged in an inner portion of an accumulator housing provided with an oil port connected to a pressure piping and an internal space of the housing is comparted into a gas chamber in which high pressure gas is charged and a liquid chamber communicating with a port hole, and the accumulator includes a type that an inner peripheral side of a bellows 51 is set to a gas chamber 55 and an outer peripheral side is set to a liquid chamber 56 by fixing the other end (a fixed end) 51*b* of the bellows 51 in which a bellows cap 52 is attached to one end (a floating end) 51*a* to an end cover 54 in an upper portion of a housing 53 as shown in FIG. 6 as shown in FIG. 6 (which is called as "inside gas type" since the gas chamber 55 is set to the inner peripheral side of the bellows 51, refer to patent document 1), and a type that the outer peripheral side of the bellows 51 is set to the gas chamber 55 and the inner peripheral side is set to the liquid chamber 56 by fixing the other end (the fixed end) 51*b* of the bellows 51 in which the bellows cap 52 is attached to one end (the floating end) 51*a* to an oil port 57 in a lower portion of the housing 53 as shown in FIG. 7 (which is called as "outside gas type" since the gas chamber 55 is set to the outer peripheral side of the bellows 51, refer to patent document 2 or 3).

In this case, in the accumulator connected to the pressure piping of a device, liquid (oil) is discharged little by little from a port hole 58 if an operation of the device is stopped, and in the outside gas type accumulator in FIG. 7 mentioned above, the bellows 51 is constricted little by little accordingly by charged gas pressure, a seal 59 provided in a lower surface of the bellows cap 52 comes into contact with the other member 60 so as to become in a so-called zero-down state. Further, in this zero-down state, since a part of the liquid is sealed within the liquid chamber 56 (a space between the bellows 51 and the seal 59) by the seal 59, and pressure of the sealed liquid balances with the gas pressure of the gas chamber 55, it is possible to inhibit excessive force from being applied to the bellows 51 so as to generate an abnormal deformation.

However, in the case that the zero-down due to the operation stop is carried out at a low temperature, and the temperature rises in this state, the liquid sealed in the liquid chamber 56 and the charged gas are thermally expanded respectively, and the respective pressures rise. In this case, a pressure rising rate is higher in the liquid than the charged gas, however, since a pressure receiving area in the bellows cap 52 is set smaller in comparison with the charged gas, the bellows cap 52 does not move until the liquid pressure becomes considerably higher than the gas pressure. Accordingly, there is a case that a great pressure difference coming to about some MPa is generated between the liquid pressure and the gas pressure in the inner and outer sides of the bellows 51, and if such the great pressure difference is generated, there is a risk that the bellows 51 is abnormally deformed or the seal 59 is damaged.

Reference is made to Unexamined Patent Publication No. 2005-315429, Japanese Unexamined Patent Publication No. 2001-336502, and Japanese Unexamined Patent Publication No. 2007-187229.

Further, since an accumulator shown in FIG. 8 is an outside gas type accumulator similarly to the accumulator in FIG. 7, and has a peculiar structure that an auxiliary liquid chamber 71 is provided in an inner peripheral side of the bellows 51, and a piston 72 with a piston seal 73 is inserted inside the auxiliary liquid chamber 71 so as to allow a free stroke, the following disadvantages are pointed out (refer to Japanese Unexamined Patent Publication No. 2003-278702).

(i) An extension of the bellows 51 can be carried out only correspondingly to a volumetric capacity of the auxiliary liquid chamber 71 (a constriction of the bellows 51 is limited if the volumetric capacity of the auxiliary liquid chamber 71 is increased, and a liquid amount for expanding the bellows 51 becomes small if the chamber 71 is made small, so that it is impossible to increase an amount of expansion).

(ii) Since the piston stroke is made in a state in which the piston 72 is sealed by the piston seal 73, a slide resistance due to seal surface pressure is great, and a motion of the bellows 51 slows down correspondingly to a loss thereof (a function as the accumulator is lowered).

Reference is made to Japanese Unexamined Patent Publication No. 2003-278702.

Further, in the following Published Japanese translation of PCT International Publication for Patent Application No. 2005-500487, there is disclosed an accumulator structured such that a secondary piston is coupled to a bellows cap via a secondary bellows, however, the following disadvantage is pointed out in this prior art.

(iii) Since a constriction of the bellows is generated in a state in which the secondary bellows is expanded at a time of zero-down, and the constriction of the bellows stops at the stage that the secondary piston reaches the lowest surface, it is impossible to secure a sufficient expansion and contraction stroke of the bellows.

Reference is made to Published Japanese translation of PCT International Publication for Patent Application No. 2005-500487.

SUMMARY OF THE INVENTION

Problem to be Solved by the Invention

The present invention is made by taking the points mentioned above into consideration, and an object of the present invention is to provide an outside gas type accumulator which is provided with a mechanism for reducing a pressure difference generated at a time when liquid sealed in a liquid chamber and charged gas are thermally expanded at a time of zero-down, whereby it becomes possible to inhibit a bellows from being abnormally deformed by reducing a pressure difference between inner and outer sides of the bellows.

Means for Solving the Problem

In order to achieve the object mentioned above, in accordance with the first aspect of the present invention, there is provided an accumulator comprising:

an accumulator housing provided with an oil port connected to a pressure piping, and a bellows arranged in an inner portion of the housing and comparting an internal space of the housing into a gas chamber in which a high pressure gas is charged and a liquid chamber communicating with a port hole, the bellows having a bellows cap in its floating end as well as being fixed to the oil port in its fixed end, and setting an outer peripheral side of the bellows as the gas chamber and setting an inner peripheral side to the liquid chamber, and an inner surface of the oil port being provided with a seal closing the liquid chamber at a time of zero-down so as to seal a part of the liquid in the liquid chamber, wherein the accumulator has a pressure difference regulation mechanism for reducing a pressure difference generated at a time when the liquid sealed in the liquid chamber and the charged gas are thermally expanded at a time of zero-down, the regulation mechanism has a movable plate supported to the oil port side of the bellows cap by a coil spring or a leaf spring, the movable plate moves together with the bellows cap in a state in which the movable plate is supported by the coil spring or the leaf spring at a time of a stationary actuation, the movable plate moves together with the bellows cap so as to come into contact with the seal at a time of zero-down, and the bellows cap moves to a position at which the liquid pressure balances with the gas pressure while compressing the coil spring or the leaf spring in a state in which the movable plate keeps in contact with the seal at a time when the liquid and the charged gas are thermally expanded.

Further, in accordance with the second aspect of the present invention, there is provided an accumulator as recited in the first aspect mentioned above, wherein a three-dimensional structure acting as a spacer is provided in one or both of opposed surfaces of the bellows cap and the movable plate.

In the present invention having the structure mentioned above, since the fixed end of the bellows is fixed to the oil port so as to set the outer peripheral side of the bellows to the gas chamber and set the inner peripheral side to the liquid chamber, the accumulator in accordance with the present invention is an outside gas type accumulator.

Further, the accumulator in accordance with the present invention is actuated as follows.

Stationary Actuating Time

Since the movable plate stays away from the seal by moving together with the bellows cap in a state in which the movable plate is supported by the coil spring or the leaf spring, the port hole and the liquid chamber (the space between the bellows and the seal) communicate. Accordingly, since the liquid provided with pressure each time is introduced freely from the port hole to the liquid chamber, the bellows cap moves together with the movable plate in such a manner that the liquid pressure balances with the gas pressure.

Zero-Down Time

If the operation of the device stops, the liquid within the liquid chamber is discharged little by little from the port hole, the bellows is constricted by the charged gas pressure in accordance with this, and the bellows cap moves in a bellows constriction direction. Since the movable plate is arranged in the oil port side of the bellows cap, the movable plate comes into contact with the seal. If the movable plate comes into contact with the seal, the liquid chamber (the space between the bellows and the seal) is closed, and a part of the liquid is sealed in this liquid chamber. Accordingly, no further pressure reduction is generated, whereby the liquid pressure and the gas pressure are balanced in the inner and outer sides of the bellows. In this case, since the element coming into contact with the seal is the movable plate, and the bellows cap does not come into contact with the seal, the pressure receiving area of the bellows cap is not limited by the seal. Therefore, the pressure receiving area of the bellows cap is set to be equal between the gas chamber side in one surface and the liquid chamber side in the opposite surface.

Thermal Expansion Time in Zero-Down State

If the liquid sealed in the liquid chamber and the charged gas are thermally expanded due to the rise of the temperature of the ambient atmosphere or the like, in the zero-down state, that is, the state in which the movable plate comes into contact with the seal, the pressure difference is generated since the pressure rising degree is higher in the liquid than the gas. In this case, in the present invention, since the pressure receiving area of the bellows cap is set to be equal between the gas chamber side and the liquid chamber side as mentioned above, the bellows cap immediately moves so as to reduce the pressure difference while compressing the coil spring or the leaf spring, if the pressure difference is generated. Accordingly, since it is possible to inhibit the great pressure difference from being generated between the inner and outer sides of the bellows, it is possible to prevent the abnormal deformation from being generated in the bellows due to the pressure difference. The coil spring or the leaf spring is provided for restoring the bellows cap at a time when the pressure is lowered.

In this case, since the pressure receiving area of the movable plate, in place of the bellows cap is limited by the seal, it does not come away (does not move) while staying in contact with the seal. Accordingly, only the bellows cap moves while compressing the coil spring or the leaf spring. Further, the coil spring or the leaf spring does not inhibit the liquid from passing through like a packing due to its three-dimensional shape. Therefore, the liquid flows into the space between the bellows cap and the movable plate in which the volumetric capacity is increased at the relative moving time, while passing through the coil spring or the leaf spring.

EFFECT OF THE INVENTION

Therefore, in accordance with the accumulator of the present invention which is actuated as mentioned above, since it is possible to reduce the pressure difference generated at a time when the liquid sealed in the liquid chamber and the charged gas are thermally expanded at a time of zero-down, in the outside gas type accumulator, it is possible to reduce the pressure difference between the inner and outer sides of the bellows, and it is possible to prevent the bellows from being abnormally deformed. Accordingly, it is possible to improve a durability of the bellows and, consequently, the accumulator. Further, since the auxiliary liquid chamber and the secondary bellows are not provided, it is possible to dissolve the disadvantages (i), (ii) and (iii) mentioned above.

Further, in the case that the three-dimensional structure acting as the spacer is provided in one or both of the opposite surfaces of the bellows cap and the movable plate, both the elements are hard to be closely attached, since the liquid easily flows between both the elements. Accordingly, it is possible to smoothen a relative movement between both the elements at a time of the thermally expanding actuation.

BRIEF EXPLANATION OF DRAWINGS

FIGS. 4A and 4B are views showing one example of a leaf spring which is used in place of a coil spring, in which FIG. 4A is a plan view and FIG. 4B is a front view;

DETAILED DESCRIPTION OF PREFERRED EMBODIMENT

The present invention includes the following embodiments.

(1) High-pressure gas is charged in an outer portion of a bellows, and liquid is output and input from a port hole to an inner portion of the bellows. A disc (a movable plate) supported by a coil spring is provided in an oil port side of a bellows cap. The disc comes into contact with a seal provided in the oil port at a time of zero-down, and prevents the liquid in the inner portion of the bellows from flowing out.

(2) Since being sealed by the disc at a time of zero-down, the pressure receiving areas become equal between the gas pressure in the bellows cap and the liquid pressure in the inner portion of the bellows. Since the disc is fixed to the bellows cap via the coil spring, the bellows cap can freely move up and down in a certain range even if the disc is in a state in which the disc is pressed onto the oil port. In the case that the liquid in the inner portion of the bellows is thermally expanded, the bellows cap can move to the position at which the gas pressure balances with the liquid pressure, in a state in which the disc keeps being pressed to the oil port. Accordingly, a differential pressure is not generated between the inner and outer sides of the bellows, and a deformation of the bellows is not generated.

(3) The coil spring mentioned above may be constructed by a leaf spring in place thereof. The coil spring and the leaf spring are all called as a metal spring.

(4) As shapes of the disc and the bellows cap, in order that the disc and the bellows cap can smoothly move relatively even in the case that they are inclined relatively, a taper is provided in a cylindrical surfaces thereof, and a projection preventing an upper surface of the disc and a lower surface of the bellows cap from being closely attached is provided on the upper surface of the disc or the lower surface of the bellows cap.

Embodiment

Next, a description will be given of an embodiment in accordance with the present invention with reference to the accompanying drawings.

Figure 1:
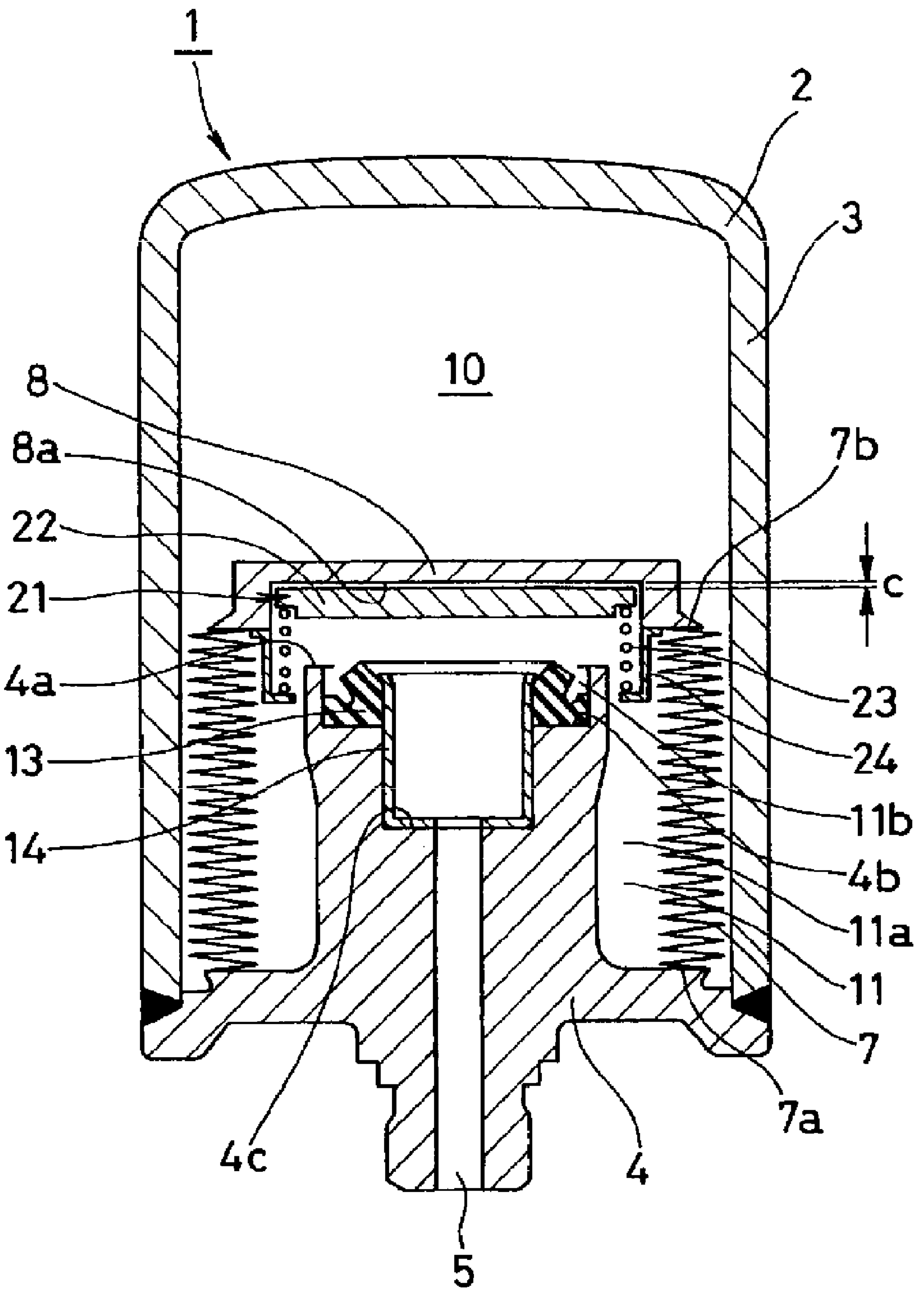
FIG. 1 is an overall sectional view showing a state at a stationary actuation time of an accumulator in accordance with an embodiment of the present invention.
Figure 2:
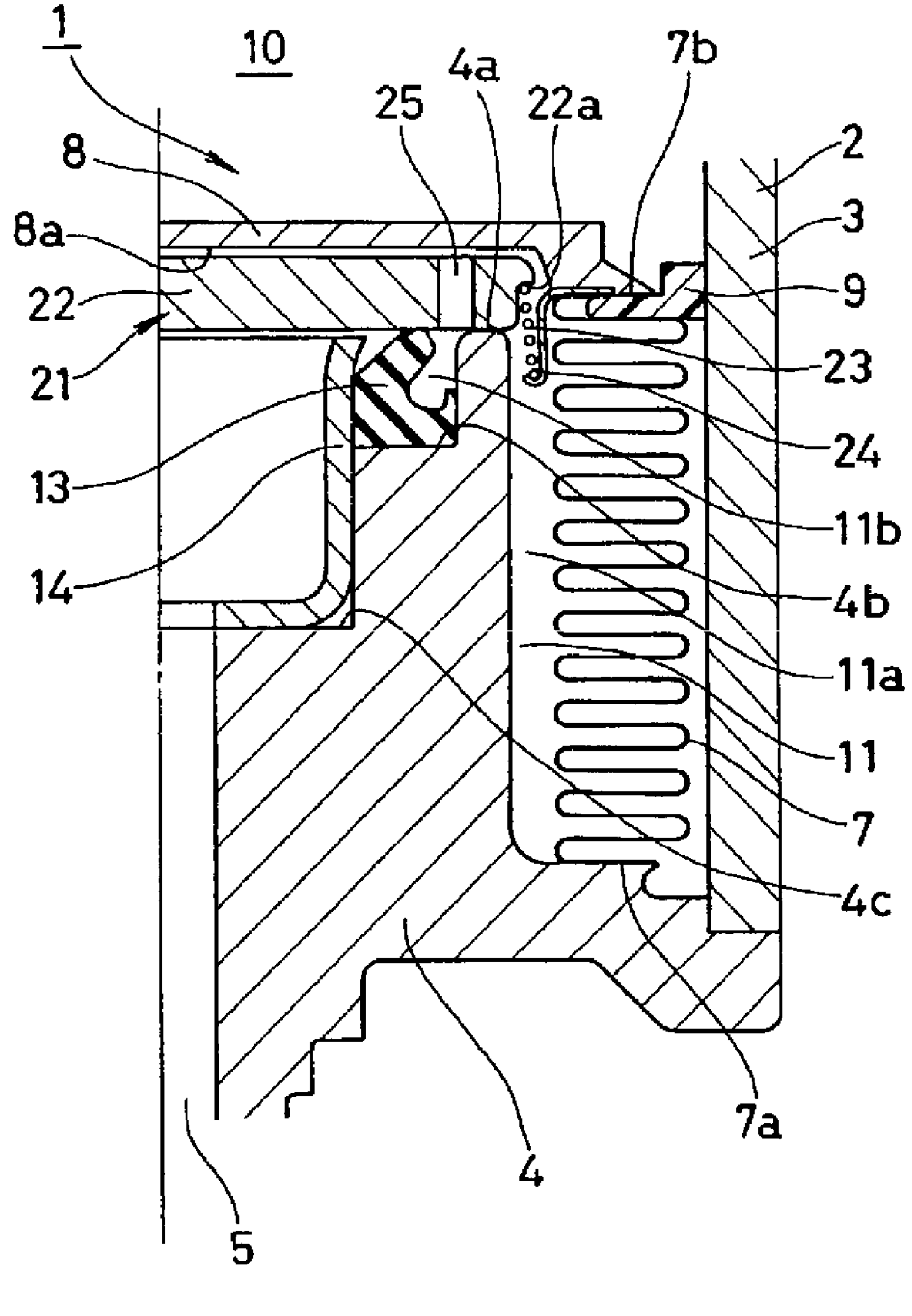
FIG. 2 is a partly sectional view showing a state at a zero-down time of the accumulator.
Figure 3:
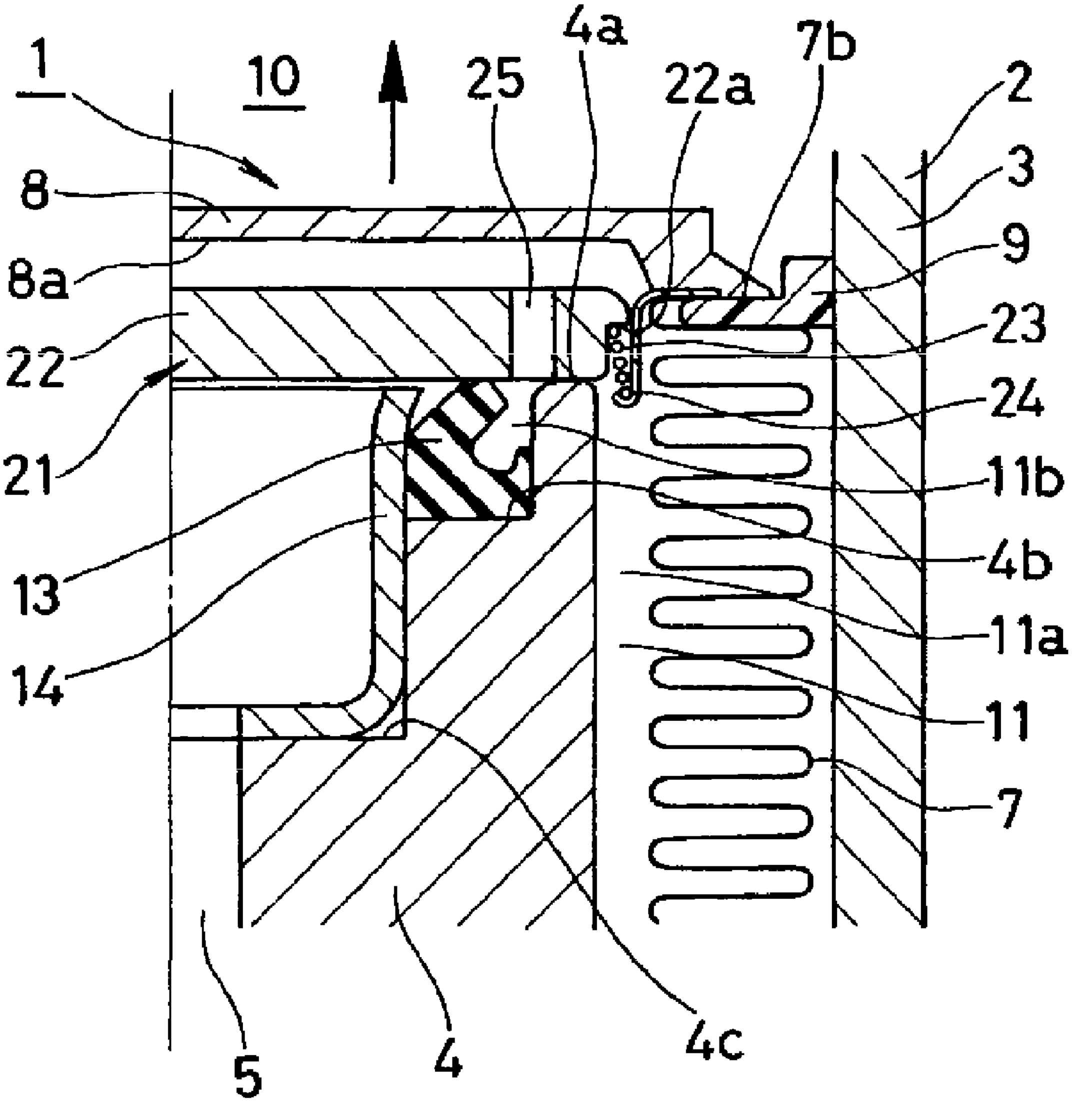
FIG. 3 is a partly sectional view showing a state at a thermal expansion time in a zero-down state of the accumulator.

FIGS. 1 to 3 shows an overall section or a partial section of an accumulator 1 in accordance with an embodiment of the present invention. FIG. 1 shows a state at a time of a stationary actuation, FIG. 2 shows a state at a time of zero-down, and FIG. 3 shows a state at a time of a thermal expansion in the zero-down state, respectively.

The accumulator 1 in accordance with the embodiment is a metal bellows type accumulator using a metal bellows as a bellows 7, and is structured as follows.

First of all, it is provided with an accumulator housing 2 having an oil port 4 connected to a pressure piping (not shown), the bellows 7 is arranged in an inner portion of the housing 2, and an internal space of the housing 2 is comparted into a gas chamber 10 being charged with high pressure gas and a liquid chamber 11 communicating with a port hole 5 of the oil port 4. As the housing 2, there is described a housing constructed by a combination of a closed-end cylindrical shell 3, and the oil port 4 fixed to an opening portion of the shell 3, however, a parts layout structure of the housing 1 is not particularly limited. For example, a bottom portion of the shell 3 may be constructed by an end cover which is independent from the shell, and in any case, the bottom portion of the shell 3 or a corresponding part is provided with a gas filler port (not shown) for filling the gas in the gas chamber 10.

The bellows 7 is structured such that a fixed end 7*a* thereof is fixed to an inner surface of a flange portion of the oil port 4 corresponding to a port side inner surface of the housing 2 and a disc-shaped bellows cap 8 is fixed to a floating end 7*b* thereof. Accordingly, the accumulator 1 is constructed as an outside gas type accumulator in which the gas chamber 10 is arranged in an outer peripheral side of the bellows 7, and a liquid chamber 11 is arranged in an inner peripheral side of the bellows 7. Further, as shown in FIG. 2, a vibration damping ring 9 is attached to an outer peripheral portion of the floating end 7*b* for preventing the bellows 7 and the bellows cap 8 from coming into contact with the inner surface of the housing 2.

Annular first and second step portions 4*b* and 4*c* are sequentially formed in an inner side of the port hole 5, that is, an inner surface (an upper surface in the figure) of the oil port 4 so as to be positioned in an inner peripheral side of an annular stopper projection (seat surface) 4*a*, and a seal 13 is fitted and attached to the first step portion 4*b*, and is held by a seal holder 14 fitted and attached to the second step portion 4*c* so as to be prevented from coming off. The seal 13 is structured such as to close the liquid chamber 11 (a space between the bellows 7 and the seal 13) at a time of zero-down of the accumulator 1 so as to seal a part of the liquid in this liquid chamber 11, and is formed by a rubber-like elastic body packing provided with an outward seal lip for sufficiently achieving this function. In this case, as the seal 13, an O-ring, an X-ring or the like may be employed as far as a sufficient seal performance can be obtained, and the present invention does not particularly limit the shape of the seal 13.

Further, the accumulator 1 is provided with a pressure difference regulation mechanism 21 for reducing a pressure difference generated at a time when each of the liquid sealed in the liquid chamber 11 and the charged gas are thermally expanded at a time of zero-down.

The pressure difference regulation mechanism 21 has a movable plate 22 supported to the oil port 4 side of the bellows cap 8 by a coil spring 23. A concave portion 8*a* accommodating the movable plate 22 is provided in a surface (a lower surface in the figure, hereinafter, refer also to as a lower surface) close to the oil port 4 of the bellows cap 8, and the movable plate 22 is accommodated in the concave portion 8*a* so as to be relatively movable. A spring retainer 24 is provided around the concave portion 8*a* in the lower surface of the bellows cap 8. A coil spring 23 is interposed between a step-shaped engagement portion 22*a* provided in an outer peripheral portion of the movable plate 22 and the spring retainer 24. Accordingly, the movable plate 22 is held by the bellows cap 8 via the spring retainer 24 and the coil spring 23 in a state of being accommodated in the concave portion 8*a* provided in the lower surface of the bellows cap 8, and the movable plate 22 and the bellows cap 8 are set to be relatively displaceable in an axial direction within a range that the coil spring 23 is compressed. At a time of a stationary operation, a predetermined gap c in an axial direction is set as illustrated in the figure, between a lower surface (a bottom surface of the concave portion) of the bellows cap 8 and a surface (an upper surface in the figure, hereinafter, refer also to as an upper surface) close to the bellows cap 8 of the movable plate 22, however, both the surfaces may be structured such as to come into contact with each other with no gap.

The movable plate 22 is constructed by a disc made of a rigid material such as a metal or the like, and is structured such as to come close to and away from the seal 13. Further, the movable plate 22 is structured such as to stop by coming into contact with the stopper projection 4*a*. Since a lip end of the seal 13 protrudes slightly beyond the stopper projection 4*a*, the movable plate 22 has already come into contact with the seal 13 at the moment when the movable plate 22 comes into contact with the stopper projection 4*a*.

Further, as shown in FIG. 2, a communication path 25 is provided in an outer peripheral portion of the movable plate 22, the communication path 25 is constructed by through holes which are formed in an outer peripheral portion of the movable plate 22 in a thickness direction, and a plurality of through holes are provided so as to be spaced at a predetermined interval in a circumferential direction of the movable plate 22. A formed position of the through holes is set to an inner side in a radial direction than a position at which they come into contact with the stopper projection 4*a*, in an outer side in the radial direction than a position at which they come into contact with the lip end of the seal 13.

Since the fixed end 7*a* of the bellows 7 is fixed to the inner surface of the flange portion of the oil port 4 corresponding to the inner surface close to the port in the housing 2, the accumulator 1 structured as mentioned above belongs to an outside gas type category, and is actuated as follows on the basis of the construction mentioned above.

At a Time of Stationary Operation

FIG. 1 shows a state at a time of a stationary operation of the accumulator 1. The oil port 4 is connected to a pressure piping of a device (not shown). In this stationary state, since the movable plate 22 stays away from the seal 13 by moving together with the bellows cap 8 in a state of being supported to the coil spring 23, the port hole 5 and the liquid chamber 11 (the space between the bellows 7 and the seal 13) communicate. Accordingly, since the liquid provided with pressure each time is introduced to the liquid chamber 11 from the port hole 5, the bellows cap 8 moves together with the movable plate 22 in such a manner that the liquid pressure and the gas pressure balance with each other.

At a Time of Zero-Down

If the operation of the device stops from the state in FIG. 1, the liquid within the liquid chamber 11 is discharged little by little from the port hole 5, the bellows 7 is contracted little by little by the charged gas pressure in accordance with this, and the bellows cap 8 is moved little by little in a bellows contracting direction. Since the movable plate 22 is arranged in the oil port 4 side of the bellows cap 8, the movable plate 22 comes into contact with the seal 13 if the bellows cap 8 is moved. As shown in FIG. 2, the movable plate 22 stops by coming into contact with the stopper projection 4*a*, and the bellows cap 8 also stops. If the movable plate 22 comes into contact with the seal 13 and the stopper projection 4*a* as mentioned above, the liquid chamber 11 (the space between the bellows 7 and the seal 13) is closed and a part of the liquid is sealed in this liquid chamber. Accordingly, any further pressure reduction is not generated in this liquid chamber 11, so that the liquid pressure balances with the gas pressure inside and outside the bellows 7. Therefore, it is possible to suppress an abnormal deformation of the bellows 7 caused by the zero-down. In this case, since the movable plate 22 comes into contact with the seal 13 and the bellows cap 8 does not come into contact therewith at a time of the zero-down, a pressure receiving area of the bellows cap 8 is not limited by the seal 13 as is different from the prior art mentioned above. Accordingly, the pressure receiving area of the bellows cap 8 is set to be equal between the gas chamber 10 side in one surface and the liquid chamber 11 side in an opposite surface.

At a Time of Thermal Expansion in Zero-Down State

If the liquid sealed in the liquid chamber 11 and the charged gas are respectively thermally expanded due to an increase of an ambient temperature or the like in a zero-down state in FIG. 2, that is, in a state in which the movable plate 22 comes into contact with the seal 13 and the stopper projection 4*a*, the pressure difference is generated since a degree of increase of the pressure is greater in the liquid than in the gas. However, since the pressure receiving area of the bellows cap 8 is set to be equal between the gas chamber 10 side and the liquid chamber 11 side in the accumulator 1, the bellows cap 8 immediately starts moving in a direction coming away from the movable plate 22 while compressing the coil spring 23 as shown in FIG. 3, and stops at a position at which the liquid pressure balances with the gas pressure, if the pressure difference is generated. Therefore, since it is possible to inhibit the great pressure difference from being generated inside and outside the bellows 7, it is possible to prevent the abnormal deformation from being generated in the bellows 7 due to the pressure difference. Since the movable plate 22 keeps being in contact with the seal 13, as illustrated in the figure, due to the difference of pressure receiving area between both the upper and lower surfaces at this time, the zero-down state does not dissolve. Further, the liquid existing in the inner peripheral side of the bellows 7 passes through a winding-shaped gap of the coil spring 23, further passes through an outer peripheral side of the movable plate 22, and flows into a gap between the bellows cap 8 and the movable plate 22.

Therefore, in accordance with the accumulator 1 mentioned above, since it is possible to reduce the pressure difference generated at a time when the liquid sealed in the liquid chamber 11 and the charged gas are respectively thermally expanded at a time of the zero-down, in the outside gas type accumulator, it is possible to reduce the pressure difference inside and outside the bellows 7, and it is possible to prevent the abnormal deformation from being generated in the bellows 7. Accordingly, it is possible to improve a durability of the bellows 7, and consequently a durability of the accumulator 1.

Further, in the zero-down state in FIG. 2, the communication path 25 constructed by the through holes provided in the movable plate 22 serves to make a space (a seal outer peripheral space) 11*b* surrounded by the stopper projection 4*a*, the seal 13 and the movable plate 22 communicate with a space (a bellows inner peripheral space) 11*a* surrounded by the bellows 7, the oil port 4, the movable plate 22 and the bellows cap 8, thereby suppressing a high pressure generation due to the thermal expansion of the liquid in the former space 11*b*. Accordingly, it is possible to prevent the seal 13 from being damaged by the high pressure generation in the space 11*b*. In this case, in order to obtain this effect, a groove extending in a radial direction may be radially provided in an end surface (an upper surface) of the stopper projection 4*a* or a lower surface of the movable plate 22 opposing thereto, in place of the through holes.

Further, with regard to the accumulator 1 in accordance with the embodiment mentioned above, there can be considered that the construction may be added or modified as follows.

Figure 4A:
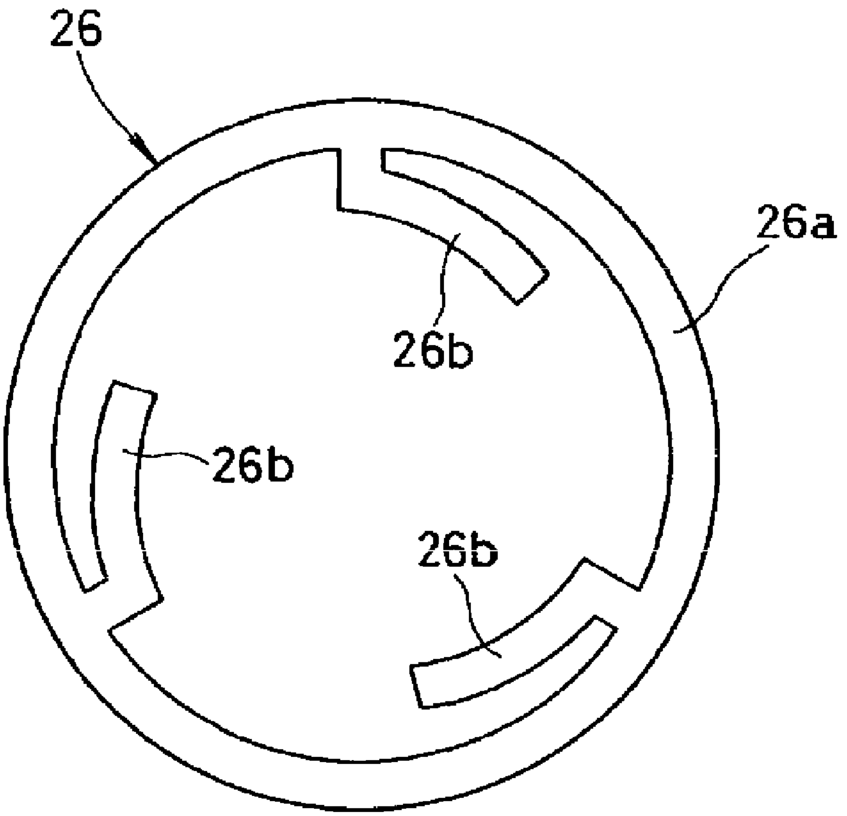
Figure 4B:
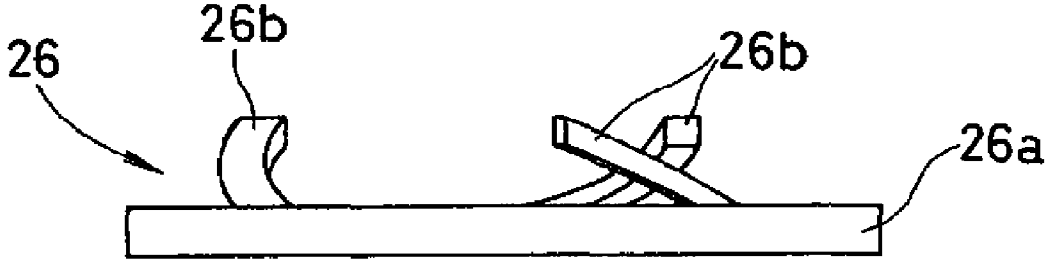

(1) In place of the coil spring 23 mentioned above, for example, a leaf spring 26 as shown in FIG. 4 is used. The leaf spring 26 in FIG. 4 is constructed by a pressed product of a metal plate, and is structured such that a plurality of hook-shaped spring portions 26*b* are integrally formed (three spring portions are uniformly arranged in the figure) in an inner peripheral side of an annular attaching portion 26*a* and the liquid passes through a gap among the spring portions 26*b*.

(2) In order that the movable plate 22 and the bellows cap 8 relatively move smoothly even in the case that they are relatively inclined, a taper shape 27 is provided in the cylinder surfaces of both the elements 8 and 22 (the outer peripheral surface of the movable plate 22 and the inner peripheral surface of the concave portion 8*a* of the bellows cap 8), as shown in each of FIGS. 5A to 5D. All the tapers are set to be inclined to the oil port 4 side from an inner diameter side toward an outer diameter side.

(3) In order that the movable plate 22 and the bellows cap 8 relatively move smoothly without being closely attached (adsorbed) to each other, a three-dimensional structure acting as a spacer is provided in any one or both of the opposed surfaces of both the elements 8 and 22, as shown in each of FIGS. 5A to 5D.

Figure 5A:
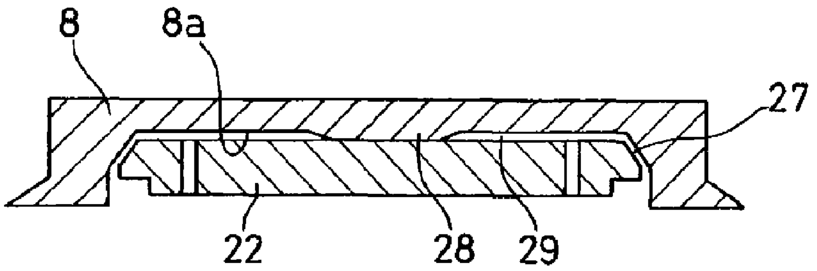
FIGS. 5A, 5B, 5C and 5D are sectional views showing an example in which a three-dimensional structure is provided in a movable plate or a bellows cap.
Figure 5B:
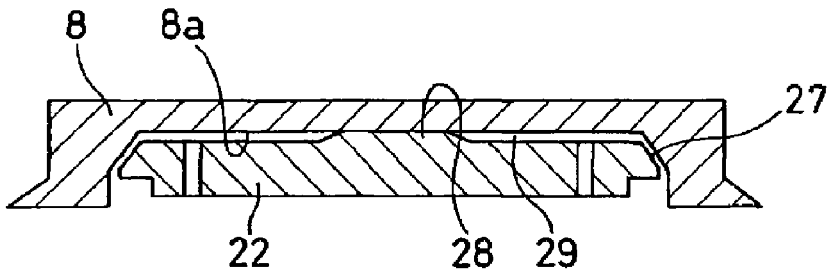
Figure 5C:
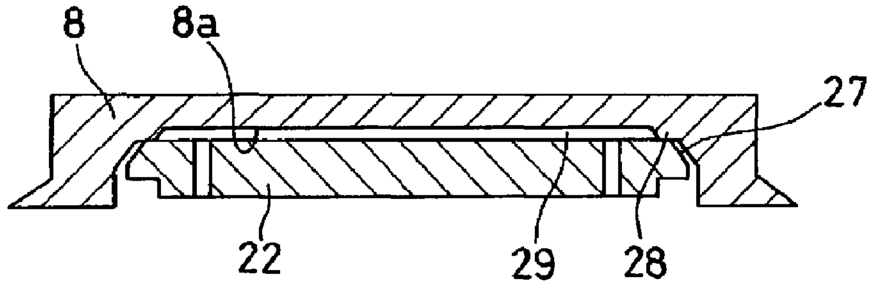
Figure 5D:
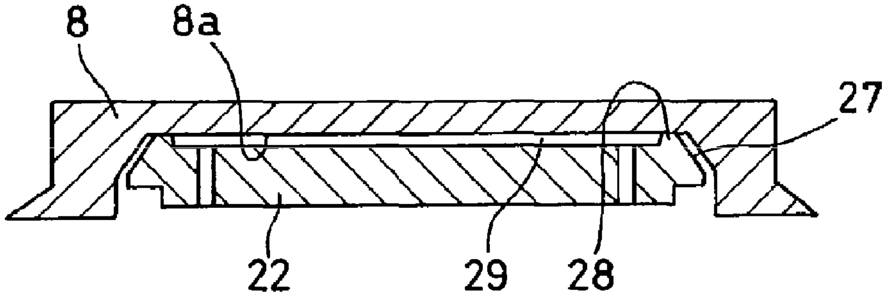
Figure 6:
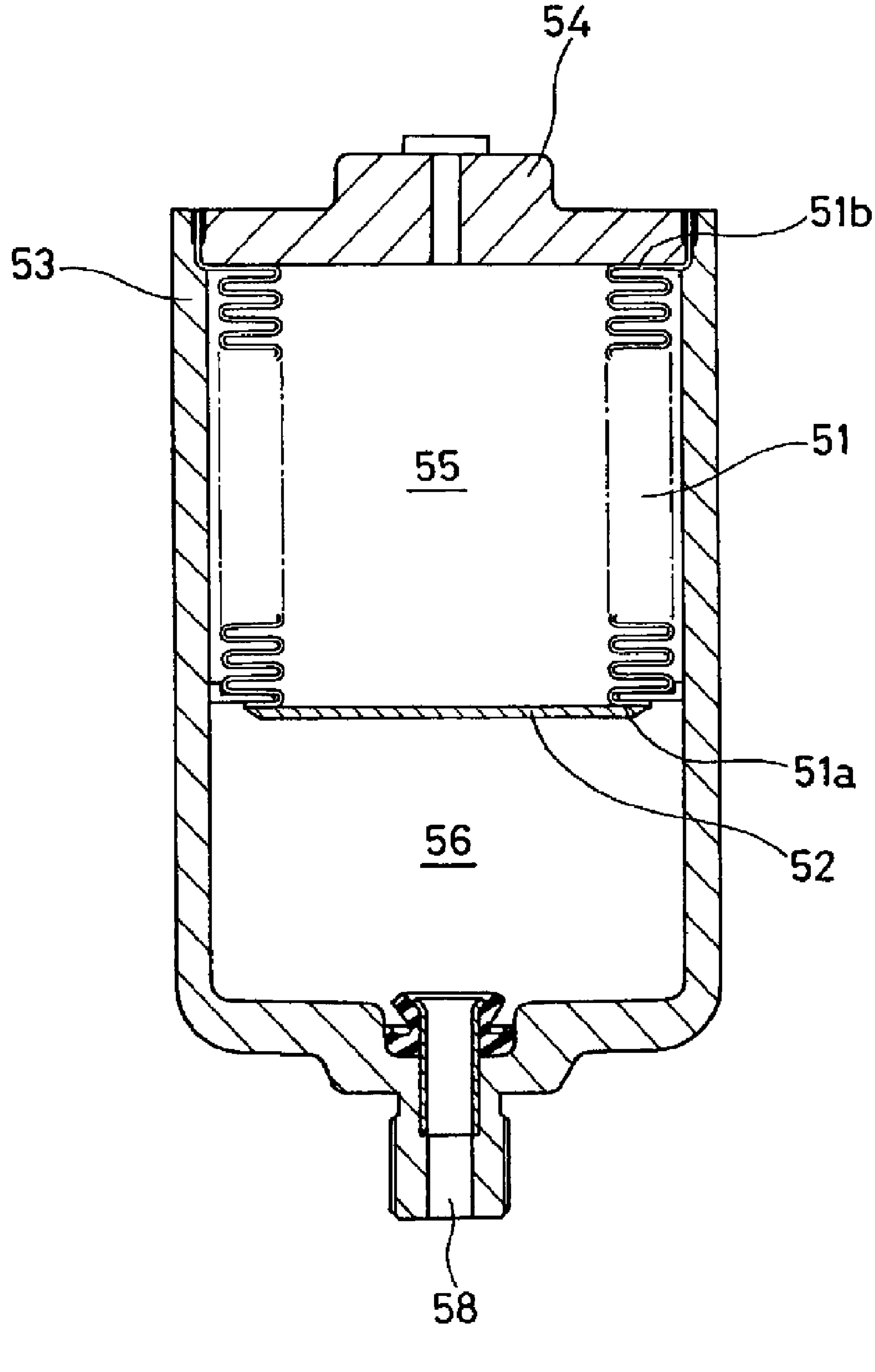
FIG. 6 is a sectional view of an accumulator in accordance with a prior art.
Figure 7:
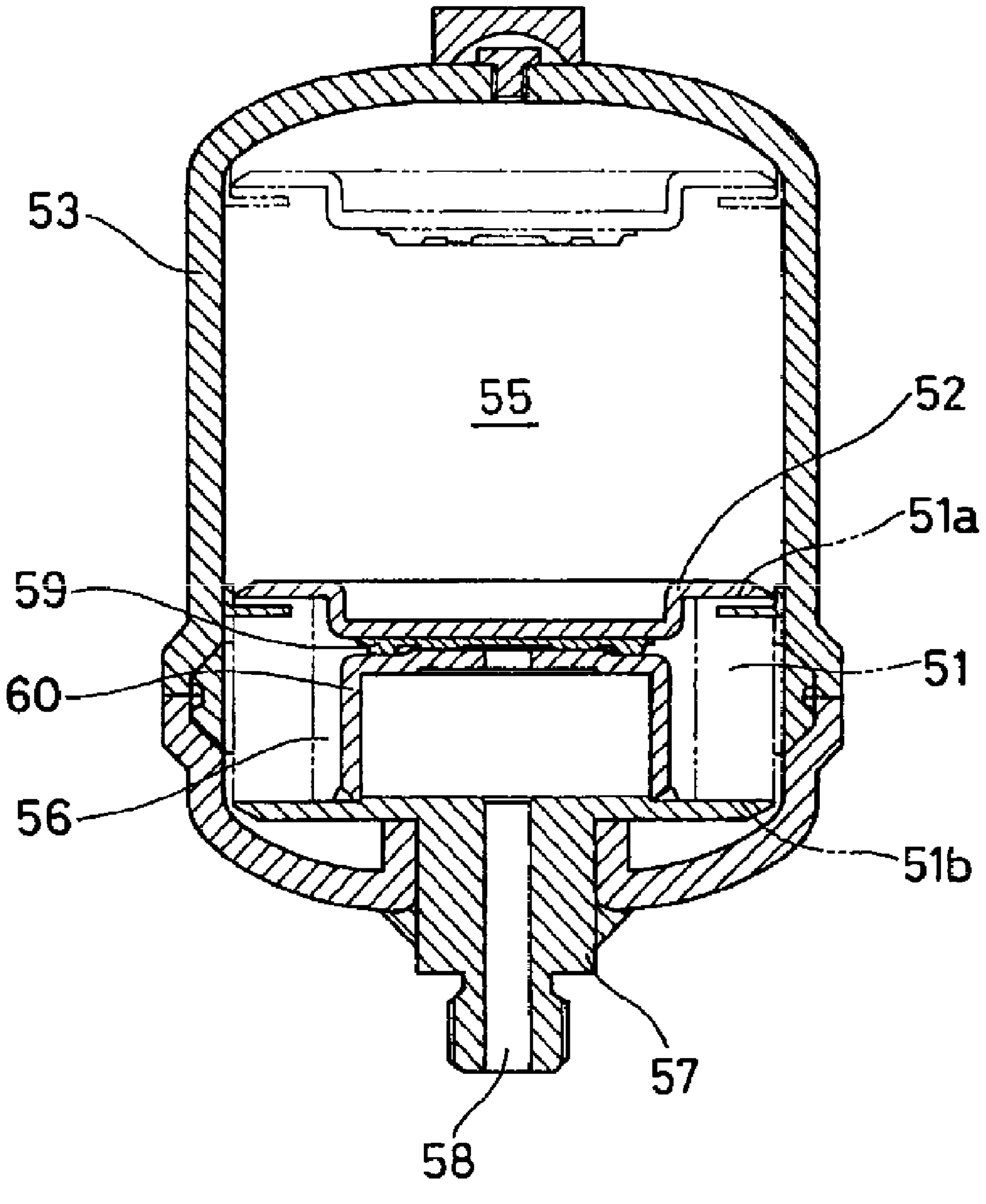
FIG. 7 is a sectional view of an accumulator in accordance with another prior art.
Figure 8:
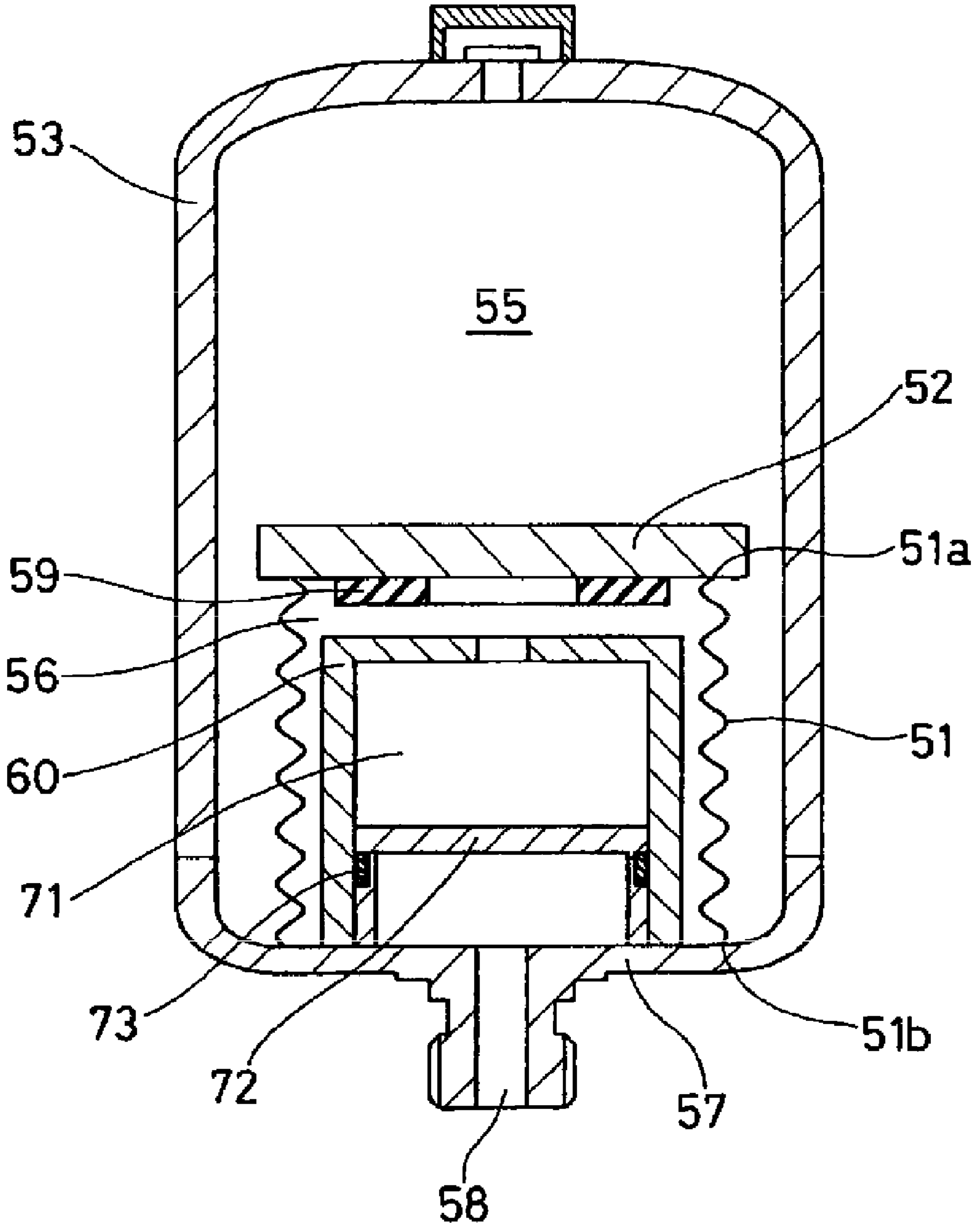
FIG. 8 is a cross sectional view of an accumulator in accordance with another prior art.

In the example in FIG. 5A, a projection 28 is provided in the center of a flat surface of the lower surface (the bottom surface of the concave portion 8*a*) of the bellows cap 8, and a gap space 29 is set in an outer peripheral side of (around) the projection 28. In the example in FIG. 5B, a projection 28 is provided in the center of a flat surface of the upper surface of the movable plate 22, and a gap space 29 is set in an outer peripheral side of (around) the projection 28. In the example in FIG. 5C, an annular projection 28 is provided in a peripheral edge portion of the lower surface (the bottom surface of the concave portion 8*a*) of the bellows cap 8, and a gap space 29 is set in an inner peripheral side of the projection 28. In this case, in order to flow the liquid in the gap space 29 in the inner peripheral side of the projection 28, a groove or notch shaped flow path (not shown) extending in a radial direction is provided in a part on a circumference of the projection 28. In the example in FIG. 5D, an annular projection 28 is provided in a peripheral edge portion of the upper surface of the movable plate 22, and a gap space 29 is set in an inner peripheral side of the projection 28. In this case, in order to flow the liquid in the gap space 29 in the inner peripheral side of the projection 28, a groove or notch shaped flow path (not shown) extending in a radial direction is provided in a part on a circumference of the projection 28.

In accordance with the structure mentioned above, even if the bellows cap 8 and the movable plate 22 come into contact with each other, the liquid easily flow into the portion between both the elements 8 and 22. Accordingly, both the elements 8 and 22 are hard to be closely attached, and it is possible to smoothen the relative movement between both the elements 8 and 22 at a time of the thermal expanding operation.

What is claimed is:

1. An accumulator comprising:

an accumulator housing provided with an oil port connected to a pressure piping, and a bellows arranged in an inner portion of said housing and comparting an internal space of said housing into a gas chamber in which high pressure gas is charged and a liquid chamber communicating with a port hole, said bellows having a bellows cap in its floating end as well as being fixed to said oil port in its fixed end, and setting an outer peripheral side of said bellows as the gas chamber and setting an inner peripheral side to the liquid chamber, and an inner surface of said oil port being provided with a seal closing the liquid chamber at a time of zero-down so as to seal a part of the liquid in said liquid chamber, wherein the accumulator has a pressure difference regulation mechanism for reducing a pressure difference generated at a time when the liquid sealed in said liquid chamber and the charged gas are thermally expanded at a time of zero-down, wherein said regulation mechanism has a movable plate supported to the oil port side of said bellows cap by a coil spring or a leaf spring, and wherein said movable plate moves together with said bellows cap in a state in which the movable plate is supported by said coil spring or the leaf spring at a time of a stationary actuation, said movable plate moves together with said bellows cap so as to come into contact with said seal at a time of zero-down, and said bellows cap moves to a position at which the liquid pressure balances with the gas pressure while compressing said coil spring or the leaf spring in a state in which said movable plate keeps in contact with said seal at a time when said liquid and the charged gas are thermally expanded.

2. An accumulator as claimed in claim 1, wherein a three-dimensional structure acting as a spacer is provided in one or both of opposed surfaces of the bellows cap and the movable plate.

* * * * *